US012568960B2

(12) United States Patent
Martelletti

(10) Patent No.: US 12,568,960 B2
(45) Date of Patent: *Mar. 10, 2026

(54) ADJUVANT COMBINATIONS AS FOLIAR UPTAKE ACCELERATOR FOR HERBICIDAL COMPOSITIONS

(71) Applicant: Bayer Aktiengesellschaft, Leverkusen (DE)

(72) Inventor: Arianna Martelletti, Sulzbach im Taunus (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 746 days.

This patent is subject to a terminal disclaimer.

(21) Appl. No.: 17/615,815

(22) PCT Filed: Jun. 2, 2020

(86) PCT No.: PCT/EP2020/065148

§ 371 (c)(1),
(2) Date: Dec. 1, 2021

(87) PCT Pub. No.: WO2020/245088

PCT Pub. Date: Dec. 10, 2020

(65) Prior Publication Data

US 2022/0322661 A1 Oct. 13, 2022

(30) Foreign Application Priority Data

Jun. 3, 2019 (EP) .................................... 19177998

(51) Int. Cl.
*A01N 25/04* (2006.01)
*A01N 25/30* (2006.01)

(52) U.S. Cl.
CPC ............. *A01N 25/04* (2013.01); *A01N 25/30* (2013.01)

(58) Field of Classification Search
CPC ......... A01N 25/00; A01N 43/56; A01N 43/90
See application file for complete search history.

(56) References Cited

U.S. PATENT DOCUMENTS

| | | | | |
|---|---|---|---|---|
| 5,013,659 A | | 5/1991 | Bedbrook et al. | |
| 5,198,012 A | * | 3/1993 | Iwasaki | A01N 57/20 504/330 |
| 5,763,462 A | * | 6/1998 | Iwasaki | A01N 57/14 514/334 |
| 5,985,647 A | | 11/1999 | Schroder et al. | |
| 2004/0087466 A1 | * | 5/2004 | Wurtz | A01N 47/22 510/422 |

FOREIGN PATENT DOCUMENTS

| | | | | | |
|---|---|---|---|---|---|
| EP | 0131624 A1 | | 1/1985 | |
| EP | 0142924 A2 | | 5/1985 | |
| EP | 0193259 A1 | | 9/1986 | |
| EP | 0221044 A1 | | 5/1987 | |
| EP | 0242236 A1 | | 10/1987 | |
| EP | 242246 A1 | | 10/1987 | |
| EP | 0257993 A2 | | 3/1988 | |
| EP | 0305398 A1 | | 3/1989 | |
| EP | 309862 A1 | | 4/1989 | |
| EP | 0464461 A2 | | 1/1992 | |
| EP | 1741339 A1 | * | 1/2007 | A01N 25/04 |
| EP | 3023006 A1 | * | 5/2016 | A01N 25/30 |
| WO | 91/13972 A1 | | 9/1991 | |
| WO | 91/19806 A1 | | 12/1991 | |
| WO | 92/00377 A1 | | 1/1992 | |
| WO | 92/11376 A1 | | 7/1992 | |
| WO | 92/14827 A1 | | 9/1992 | |
| WO | WO-2008049618 A2 | * | 5/2008 | A01N 25/30 |
| WO | WO-2014060557 A2 | * | 4/2014 | A01N 25/02 |

OTHER PUBLICATIONS

Arand et al., J. Agric. Food Chem., vol. 66, No. 23, Jun. 13, 2018, pp. 5770-5777 (Year: 2018).*
Solvay: "China International Agrochemical", Breakthrough innovative and sustainable solution for herbicide, Mar. 1-3, 2017, Shanghai, pp. 1-19 (Year: 2017).*
International Search Report for Application No. PCT/EP2020/065148 mailed Jul. 16, 2020.
Katja Arand, et al., "The Mode of Action of Adjuvants-Relevance of Physicochemical Properties for Effects on the Foliar Application, Cuticular Permeability, and Greenhouse Performance of Pinoxaden," Journal of Agricultural and Food Chemistry, (2018), vol. 66, 5770-5777.
Solvay, "Breakthrough Innovative and Sustainable Solution for Herbicide," CAC Conference Shanghai 2017, (2017), 1-19.
Uwe Sonnewald, et al., "Transgenic tobacco plants expressing yeast-derived invertase in either the cytosol, vacuole or apoplast: a powerful tool for studying sucrose metabolism and sink/source interactions," The Plant Journal, (1991), vol. 1, No. 1 : 95-106.
Frank P. Wolter, et al., "rbcS genes in Solanum tuberosum: Conservation of transit peptide and exon shuffling during evolution," Proceedings of the National Academy of Sciences, (1988), vol. 85, No. 3 : 846-850.
Hans-Peter Braun, et al., "The general mitochondrial processing peptidase from potato is an integral part of cytochrome c reductase of the respiratory chain," The EMBO Journal, (1992), vol. 11, No. 9 : 3219-3227.

* cited by examiner

*Primary Examiner* — Karl J Puttlitz
(74) *Attorney, Agent, or Firm* — Michael Vanengelen

(57) ABSTRACT

The present invention relates to agrochemically active herbicidal compositions and to the use thereof for control of harmful plants. The present invention further relates to adjuvant combinations for improving bioavailability, especially cuticle penetration, of active herbicidal ingredients.

9 Claims, No Drawings

ADJUVANT COMBINATIONS AS FOLIAR UPTAKE ACCELERATOR FOR HERBICIDAL COMPOSITIONS

CROSS-REFERENCE TO RELATED APPLICATIONS

This application is the National Stage entry of International Application No. PCT/EP2020/065148, filed 2 Jun. 2020 which claims priority to European Patent Application No. 19177998.2, filed 3 Jun. 2019.

BACKGROUND

Field

The present invention relates to agrochemically active herbicidal compositions and to the use thereof for control of harmful plants. The present invention further relates to adjuvant combinations for improving bioavailability, especially cuticle penetration, of active herbicidal ingredients.

In particular, the present invention relates to adjuvant combinations comprising tris(2-ethylhexyl) phosphate (TEHP hereinafter), at least one adjuvant from the class of the alkyl ether phosphate ammonium salts and at least one emulsifier and/or wetting agent, preferably at least one emulsifier and at least one wetting agent.

The present invention further relates to agrochemically active herbicidal compositions in conjunction with the abovementioned adjuvant combination according to the invention.

These herbicidal compositions are of particularly good suitability for control of unwanted harmful plants, and the adjuvant combination improve bioavailability and cuticle penetration in particular.

Description of Related Art

It is known that the use of liquid adjuvants can improve the herbicidal efficacy of active agrochemical ingredients, in particular of herbicides.

Adjuvants in agrochemical formulations can have various functions, for example improvement of the application of spray liquors, increase in the efficacy of active agrochemical ingredients, and reduction of drift of the active ingredients. ASTM E-1519 describes various functions of adjuvants that are known in industry and academic research.

The prior art already discloses some herbicidal compositions comprising tris(2-ethylhexyl) phosphate, and also the improved biological action of active agrochemical ingredients by virtue of this adjuvant. WO 2008/049618 A1 describes herbicidal compositions comprising pinoxaden and organic phosphates or phosphonates, including tris(2-ethylhexyl) phosphate. Pinoxaden is known, for example, from "The Pesticide Manual", 16th edition, The British Crop Protection Council and the Royal Soc. of Chemistry, 2012, and is described therein as active herbicidal ingredient for use against harmful plants in wheat and barley.

The compatibility of the herbicidal compositions known from WO 2008/049618 A1 with respect to further crop plants, such as maize, oilseed rape, soya, cotton and sugarcane, and also the herbicidal action of these compositions with respect to such harmful plants that typically occur in plantations of the latter crop plants, is unsatisfactory.

Also known are alkyl ethoxy phosphate ammonium salts, for example Geronol© CF/AR-E from Solvay, for use in glyphosate formulations. On account of the high water solubility of this active ingredient, however, these have fundamentally different characteristics and demands from lipophilic active ingredients and adjuvants that are soluble in organic solvents.

SUMMARY

It was an object of the present invention to provide adjuvant combinations and herbicidal compositions that have elevated bioavailability and cuticle penetration, and hence better action in the case of low active ingredient deployment.

It has now been found that the adjuvant combinations according to the invention, in herbicidal compositions containing particular compounds, have very good action and good tolerance by important crop plants.

More particularly, it has been found that adjuvant combinations comprising tris(2-ethylhexyl) phosphate and alkyl ether phosphate ammonium salts lead to improved action compared to the individual adjuvants.

The present invention thus provides adjuvant combinations comprising:

a) tris(2-ethylhexyl) phosphate, b) at least one alkyl ether phosphate ammonium salt, and c) at least one emulsifier or wetting agent.

In an alternative embodiment, the present invention provides an adjuvant combination comprising:

a) tris(2-ethylhexyl) phosphate, b) at least one alkyl ether phosphate ammonium salt, c) at least one emulsifier, and d) at least one wetting agent.

DETAILED DESCRIPTION OF A PREFERRED EMBODIMENT

Component a) is present in the adjuvant combination preferably at 40% by weight to 60% by weight, further preferably at 45% by weight to 55% by weight, and especially preferably 48% by weight to 52% by weight, based on the total weight of the adjuvant combination.

Component b) is present in the adjuvant combination preferably at 20% by weight to 35% by weight, further preferably at 25% by weight to 35% by weight, and especially preferably 28% by weight to 32% by weight, based on the total weight of the adjuvant combination.

If either component c) or d) is present, these are present in the adjuvant combination preferably at 10% by weight to 25% by weight, further preferably at 12% by weight to 23% by weight, and especially preferably 12% by weight to 22% by weight, based on the total weight of the adjuvant combination.

If both c) and d) are present, the figures that follow are applicable.

Component c) is present in the adjuvant combination preferably at 5% by weight to 10% by weight, further preferably at 6% by weight to 8% by weight, and especially preferably 6% by weight to 7% by weight, based on the total weight of the adjuvant combination.

Component d) is present in the adjuvant combination preferably at 10% by weight to 15% by weight, further preferably at 10% by weight to 14% by weight, and especially preferably 12% by weight to 14% by weight, based on the total weight of the adjuvant combination.

Even if not every individual combination of the different preferred ranges is specified, it will be immediately apparent to the person skilled in the art that all preferred ranges of the individual components can be combined with one another, preferably those at the same preference level and especially the most preferred ranges in each case.

Unless stated otherwise, the percentages by weight in the present application add up to 100%.

Active herbicidal ingredients in the context of the present invention also include safeners and plant growth regulators, unless stated otherwise.

Lists of ingredients in an open form of words shall, in a preferred embodiment, also disclose these lists that are complete and do not include any further ingredients unless stated otherwise in the present invention.

The present invention further relates to herbicidal compositions based on the abovementioned adjuvant combination according to the invention, comprising:

A) at least one active agrochemical ingredient selected from the group comprising the herbicides, plant growth regulators and safeners, and B) the adjuvant combinations according to the invention as described above.

The herbicidal compositions according to the invention are typically used in the form of what are called self-emulsifiable ready-to-use formulations. It is likewise possible to add components a) and b) as described above to component A by the tankmix method.

The herbicidal compositions according to the invention typically contain, in the ready-diluted spray liquor, A) at least one active ingredient at preferably 0.1-1.5 g/l, further preferably 0.2-1.0 g/l and more preferably 0.4-0.8 g/l, and B) adjuvant combination at preferably 3-8 g/l, further preferably 5-7 g/l, and especially preferably 6-7 g/l.

Active ingredients A) to be used in accordance with the invention are selected from the group consisting of bicyclopyrone, mesotrione, fomesafen, tralkoxydim, napropamide, amitraz, propanil, pyrimethanil, dicloran, tecnazene, toclofos-methyl, flamprop-M, 2,4-D, MCPA, mecoprop, clodinafop-propargyl, cyhalofop-butyl, diclofop-methyl, haloxyfop, quizalofop-P, indol-3-ylacetic acid, 1-naphthylacetic acid, isoxaben, tebutam, chlorthal-dimethyl, benomyl, benfuresate, dicamba, dichlobenil, benazolin, triazoxide, fluazuron, teflubenzuron, phenmedipham, acetochlor, alachlor, metolachlor, pretilachlor, thenylchlor, alloxydim, butroxydim, clethodim, cyclodim, sethoxydim, tepraloxydim, pendimethalin, dinoterb, bifenox, oxyfluorfen, acifluorfen, fluazifop, S-metolachlor, glyphosate, glufosinate, paraquat, diquat, fluoroglycofen-ethyl, bromoxynil, ioxynil, imazamethabenz-methyl, imazapyr, imazaquin, imazethapyr, imazapic, imazamox, flumiclorac-pentyl, picloram, amidosulfuron, chlorsulfuron, nicosulfuron, rimsulfuron, triasulfuron, triallate, pebulate, prosulfocarb, molinate, atrazine, simazine, cyanazine, ametryn, prometryn, terbuthylazine, terbutryn, sulcotrione, isoproturon, linuron, fenuron, chlorotoluron, metoxuron, diflufenican, flufenacet, fluroxypyr, aminopyralid, pyroxsulam, XDE-848 Rinskor™ halauxifen-methyl, tembotrione, isoxaflutole, metribuzin, topramezone, pyroxasulfone, bixlozone, and also prohexadione and prohexadione-Ca and benoxacor, cloquintocet-mexyl, cyometrinil, dichlormid, fenchlorazole-ethyl, fenclorim, flurazole, fluxofenim, mefenpyr-diethyl, MG-191, naphthyl anhydride, and oxabetrinil, isoxadifen-ethyl, furilazole, cyprosulfamide.

The active ingredient A) is preferably selected from the group comprising bicyclopyrone, bixlozone, dicamba, cinmethylin, isoxaflutole, mesotrione, metribuzin, tembotrione, pyroxasulfone, Rinskor™ sulcotrione, tolpyralate, topramezone, prohexadione-Ca, cloquintocet-mexyl, cyprosulfamide, mefenpyr-diethyl.

The active ingredient A) is more preferably selected from the group comprising tembotrione, isoxaflutole, bixlozone, pyroxasulfone, XDE-848 (Rinskor™), thiafenacil, prohexadione-Ca, mefenpyr-diethyl and cyprosulfamide.

In the adjuvant combination, a) is as defined above.

In the adjuvant combination, b) is preferably an alkyl ether phosphate ammonium salt, further preferably b) is a 70% blend of C8-C10 mono- and dialkyl ether phosphate ammonium salts with free C8-C10 alcohols <10% and <10% triethylene glycol monobutyl ether.

The emulsifier c) is preferably selected from the group of the nonionic dispersants comprising ethoxylated nonylphenols, ethylene oxide-propylene oxide block copolymers, end group-capped and non-end group-capped alkoxylated linear and branched, saturated and unsaturated alcohols (e.g. butoxy polyethylene-propylene glycols), reaction products of alkylphenols with ethylene oxide and/or propylene oxide, ethylene oxide-propylene oxide block copolymers, polyethylene glycols and polypropylene glycols, and also fatty acid esters, fatty acid polyglycol ether esters, alkylsulfonates, alkylsulfates, arylsulfates, ethoxylated arylalkylphenols, for example tristyrylphenol ethoxylate having an average of 16 ethylene oxide units per molecule, and also ethoxylated and propoxylated arylalkylphenols, and also sulfated or phosphated arylalkylphenol ethoxylates or ethoxy- and propoxylates.

Further preferred are castor oil polyglycol ether esters, for example Lucramul® CO 30.

The wetting agent d) is preferably selected from the group comprising alkali metal, alkaline earth metal or ammonium salts of sulfonates, sulfates, especially of alkyl ether sulfates, further preferably the sodium salts of alkyl ether sulfates, phosphates, carboxylates and mixtures thereof, for example the salts of the alkylsulfonic acids or alkylphosphoric acids and alkylarylsulfonic or alkylarylphosphoric acids, diphenylsulfonates, alpha-olefinsulfonates, lignosulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates, and nonionic wetting agents that are reaction products of linear or branched alcohols with ethylene oxide, where these may be endgroup-capped or non-endgroup-capped, and also mixtures thereof.

Examples of sulfates are sulfates of fatty acids and oils, of ethoxylated alkylphenols, of alcohols, of ethoxylated alcohols or of fatty acid esters. Examples of phosphates are phosphate esters. Examples of carboxylates are alkyl carboxylates and carboxylated alcohol ethoxylates or alkylphenol ethoxylates. Likewise suitable is the group of anionic emulsifiers of the alkali metal, alkaline earth metal and ammonium salts of the polystyrenesulfonic acids, salts of the polyvinylsulfonic acids, salts of the alkylnaphthalenesulfonic acids, salts of alkylnaphthalenesulfonic acid-formaldehyde condensation products, salts of condensation products of naphthalenesulfonic acid, phenolsulfonic acid and formaldehyde. Examples are calcium dodecylbenzenesulfonate such as Rhodocal® 70/B (Solvay), Phenylsulfonat CA100 (Clamant) or isopropylammonium dodecylbenzenesulfonates such as Atlox® 3300B (Croda).

Further preferably, the wetting agent is selected from the group comprising the alkali metal, alkaline earth metal or ammonium salts of sulfonates, and sulfates, and also linear alcohols with ethylene oxide, more preferably of alkyl ether sulfates, and most preferably the sodium salts of alkyl ether sulfates and linear alcohols with ethylene oxide, for example Genapol® LRO, Genapol® LRO Paste and Genapol® X-060. The herbicidal compositions according to the invention may be used in customary formulations known to those skilled in the art. Possible formulations include, for example: wettable powders (WP), water-soluble powders (SP), water-soluble concentrates, emulsifiable concentrates (EC), emulsions (EW), such as oil-in-water and water-in-oil emulsions, sprayable solutions, suspension concentrates (SC), oil-based dispersions (OD), soluble liquids (SL), suspoemulsions (SE), dispersible concentrates (DC), oil-miscible solutions, capsule suspensions (CS), dusting products (DP), dressings, granules for scattering and soil application, granules (GR) in the form of microgranules, spray granules, absorption and adsorption granules, water-dispersible granules (WG), water-soluble granules (SG), ULV formulations, microcapsules and waxes. These individual formulation types are known in principle and are described, for example, in: Winnacker-Küchler, "Chemische Technologie" [Chemical Technology], Volume 7, C. Hanser Verlag Munich, 4th Ed. 1986, Wade van Valkenburg, "Pesticide Formulations", Marcel Dekker, N.Y., 1973, K. Martens, "Spray Drying" Handbook, 3rd Ed. 1979, G. Goodwin Ltd. London.

The necessary formulation auxiliaries, such as inert materials, surfactants, solvents and further additives, are likewise known and are described, for example, in: Watkins, "Handbook of Insecticide Dust Diluents and Carriers", 2nd ed., Darland Books, Caldwell N.J., H.v. Olphen, "Introduction to Clay Colloid Chemistry", 2nd ed., J. Wiley & Sons, N.Y., C. Marsden, "Solvents Guide", 2nd ed., Interscience, N.Y. 1963, McCutcheon's "Detergents and Emulsifiers Annual", MC Publ. Corp., Ridgewood N.J., Sisley and Wood, "Encyclopedia of Surface Active Agents", Chem. Publ. Co. Inc., N.Y. 1964, Schonfeldt, "Grenzflächenaktive Äthylenoxidaddukte" [Interface-active Ethylene Oxide Adducts], Wiss. Verlagsgesell., Stuttgart 1976, Winnacker-Küchler, "Chemische Technologie", Volume 7, C. Hanser Verlag Munich, 4th ed. 1986.

On the basis of these formulations, it is also possible to produce combinations with other pesticidally active substances, for example insecticides, acaricides, herbicides, fungicides, and also with safeners, fertilizers and/or growth regulators, for example in the form of a finished formulation or as a tank mix.

Wettable powders are preparations dispersible homogeneously in water which, as well as the active ingredient, apart from a diluent or inert substance, also contain ionic and/or nonionic surfactants (wetting agents, dispersants). To produce the wettable powders, the active herbicidal ingredients are finely ground, for example in customary apparatuses such as hammer mills, blower mills and air-jet mills, and simultaneously or subsequently mixed with the formulation auxiliaries.

Emulsifiable concentrates are produced by dissolving the active ingredient in an organic solvent, for example butanol, cyclohexanone, dimethylformamide, xylene, or else relatively high-boiling aromatics or hydrocarbons or mixtures of the organic solvents, with addition of one or more ionic and/or nonionic surfactants (emulsifiers).

Dusting products are obtained by grinding the active ingredient with finely distributed solids, for example talc, natural clays, such as kaolin, bentonite and pyrophyllite, or diatomaceous earth.

Suspension concentrates may be water- or oil-based. They may be produced, for example, by wet grinding by means of conventional ball mills.

Emulsions, for example oil-in-water emulsions (EW), can be produced, for example, by means of stirrers, colloid mills and/or static mixers using aqueous organic solvents and optionally surfactants as already listed above, for example, for the other formulation types.

Granules can be produced either by spraying the active ingredient onto granular inert material capable of adsorption or by applying active ingredient concentrates to the surface of carrier substances, such as sand, kaolinites or granular inert material, by means of adhesives, for example polyvinyl alcohol, sodium polyacrylate or else mineral oils. Water-dispersible granules are produced generally by the customary processes such as spray-drying, fluidized-bed granulation, pan granulation, mixing with high-speed mixers and extrusion without solid inert material.

For the production of pan granules, fluidized bed granules, extruder granules and spray granules, see, for example, processes in "Spray-Drying Handbook" 3rd ed. 1979, G. Goodwin Ltd., London, J. E. Browning, "Agglomeration", Chemical and Engineering 1967, pages 147 ff.; "Perry's Chemical Engineer's Handbook", 5th Ed., McGraw-Hill, New York 1973, pp. 8-57. For further details regarding the formulation of crop protection compositions, see, for example, G. C. Klingman, "Weed Control as a Science", John Wiley and Sons, Inc., New York, 1961, pages 81-96 and J. D. Freyer, S. A. Evans, "Weed Control Handbook", 5th Ed., Blackwell Scientific Publications, Oxford, 1968, pages 101-103.

In addition, the active ingredient formulations mentioned may optionally include the respective customary stickers, preservatives, antifreeze and solvents, a bactericide, fillers, carriers and dyes, defoamer, fragrance, evaporation inhibitors, and pH and viscosity modifiers, which are very well known to the person skilled in the art. Standard formulation publications contain examples of such components suitable for use in this invention (e.g. Chemistry and Technology of Agrochemical Formulations, ed. Alan Knowles, published by Kluwer Academic Publishers, the Netherlands in 1998; and Adjuvants and Additives: 2006 edition by Alan Knowles, Agrow Report DS256, published by Informa UK Ltd, December 2006).

For application, the formulations in the commercial form are diluted if appropriate in a customary manner, for example with water in the case of wettable powders, emulsifiable concentrates, dispersions and water-dispersible granules. Preparations in dust form, granules for soil application or granules for scattering and sprayable solutions are not normally diluted further with other inert substances prior to application.

The herbicidal compositions according to the invention are typically used in the form of what are called ready-to-use formulations. It is likewise possible to add the adjuvant combinations B) according to the invention to component A) by the tankmix method.

The herbicidal compositions according to the invention can be applied in a manner known to the person skilled in the art, for example together (for example as a co-formulation or as a tank-mix) or else at different times in short succession (splitting), for example to the plants, plant parts, plant seeds or the area in which the plants grow. It is possible, for example, to apply the individual active ingredients or the herbicidal compositions in two or more portions (sequential application), for example by pre-emergence applications followed by post-emergence applications or by early post-emergence applications followed by medium or late post-emergence applications.

In the herbicidal compositions according to the invention, the application rate of component A is typically 5 to 450 g of active ingredient (a.i.) per hectare, preferably 40 to 400 g a.i./ha, more preferably 100 to 200 g a.i./ha.

On application of the herbicidal compositions according to the invention, a very broad spectrum of harmful plants is controlled pre-emergence and post-emergence, for example annual and perennial mono- or dicotyledonous weeds and unwanted crop plants. The herbicidal compositions according to the invention are particularly suitable for use in crops such as maize and sugarcane, and also for use in perennial crops, plantations and on uncultivated land. Preference is given to the use thereof in crops of maize and sugarcane. They are likewise of very good suitability for use in transgenic crops of maize.

The present invention further thus provides a method of controlling unwanted plants in plant crops, which is characterized in that components A and B of the herbicidal compositions according to the invention are deployed, for example separately or together, onto the plants (for example harmful plants such as mono- or dicotyledonous weeds or unwanted crop plants) or the area in which the plants grow.

Unwanted plants are understood to mean all plants growing at sites where they are unwanted. These may be, for example, harmful plants (e.g. mono- or dicotyledonous weeds or unwanted crop plants).

Monocotyledonous weeds come, for example, from the genera *Echinochloa, Setaria, Panicum, Digitaria, Phleum, Poa, Festuca, Eleusine, Brachiaria, Lolium, Bromus, Avena, Cyperus, Sorghum, Agropyron, Cynodon, Monochoria, Fimbristylis, Sagittaria, Eleocharis, Scirpus, Paspalum, Ischaemum, Sphenoclea, Dactyloctenium, Agrostis, Alopecurus, Apera*. Dicotyledonous weeds come, for example, from the genera *Sinapis, Lepidium, Galium, Stellaria, Matricaria, Anthemis, Galinsoga, Chenopodium, Urtica, Senecio, Amaranthus, Portulaca, Xanthium, Convolvulus, Ipomoea, Polygonum, Sesbania, Ambrosia, Cirsium, Carduus, Sonchus, Solanum, Rorippa, Rotala, Lindernia, Lamium, Veronica, Abutilon, Emex, Datura, Viola, Galeopsis, Papaver, Centaurea, Trifolium, Ranunculus, Taraxacum, Euphorbia.*

The invention also provides for the use of the herbicidal compositions according to the invention for control of unwanted plant growth, preferably in crops of useful plants.

The herbicidal compositions according to the invention can be produced by known processes, for example as mixed formulations of the individual components, optionally with further active ingredients, additives and/or customary formulation auxiliaries, and these are then applied in a customary manner diluted with water, or as tankmixes by joint dilution of the separately formulated or partly separately formulated individual components with water. Likewise possible is the application at different times (split application) of the separately formulated or partly separately formulated individual components. It is also possible to apply the individual components or the herbicidal compositions in a plurality of portions (sequential application), for example by pre-emergence applications followed by post-emergence applications or by early post-emergence applications followed by medium or late post-emergence applications. Preference is given to the joint or immediately successive application of the active ingredients in the respective combination.

The herbicidal compositions according to the invention can also be used for control of harmful plants in crops of genetically modified plants which are known or are yet to be developed.

In general, the transgenic plants are characterized by particular advantageous properties, for example by resistances to certain pesticides, in particular certain herbicides, resistances to plant diseases or pathogens of plant diseases, such as certain insects or microorganisms such as fungi, bacteria or viruses. Other particular properties relate, for example, to the harvested material with regard to quantity, quality, storability, composition and specific constituents. For instance, there are known transgenic plants with an elevated starch content or altered starch quality, or those with a different fatty acid composition in the harvested material. Other particular properties may be tolerance or resistance to abiotic stressors, for example heat, low temperatures, drought, salinity and ultraviolet radiation.

Conventional ways of producing novel plants which have modified properties in comparison to existing plants consist, for example, in traditional cultivation methods and the generation of mutants. Alternatively, novel plants with modified properties can be generated with the aid of recombinant methods (see, for example, EP-A-0221044, EP-A-0131624). For example, there have been descriptions in several cases of:

- genetic modifications of crop plants for the purpose of modifying the starch synthesized in the plants (for example WO 92/11376, WO 92/14827, WO 91/19806),
- transgenic crop plants which are resistant to particular herbicides of the glufosinate type (cf., for example, EP-A-0242236, EP-A-242246) or glyphosate type (WO 92/00377) or of the sulfonylurea type (EP-A-0257993, U.S. Pat. No. 5,013,659),
- transgenic crop plants, for example cotton, which is capable of producing *Bacillus thuringiensis* toxins (Bt toxins), which make the plants resistant to certain pests (EP-A-0142924, EP-A-0193259),
- transgenic crop plants having a modified fatty acid composition (WO 91/13972),
- genetically modified crop plants with novel constituents or secondary metabolites, for example novel phytoalexins, which bring about an increased disease resistance (EPA 309862, EPA0464461),
- genetically modified plants having reduced photorespiration, which have higher yields and higher stress tolerance (EPA 0305398),
- transgenic crop plants which produce pharmaceutically or diagnostically important proteins ("molecular pharming"),
- transgenic crop plants which feature higher yields or better quality,
- transgenic crop plants which feature a combination, for example, of the abovementioned novel properties ("gene stacking").

Numerous molecular biology techniques which can be used to produce novel transgenic plants with modified properties are known in principle; see, for example, I. Potrykus and G. Spangenberg (eds.) Gene Transfer to Plants, Springer Lab Manual (1995), Springer Verlag Berlin, Heidelberg, or Christou, "Trends in Plant Science" 1 (1996) 423-431.

For such genetic manipulations, nucleic acid molecules which allow mutagenesis or sequence alteration by recombination of DNA sequences can be introduced into plasmids. With the aid of standard methods, it is possible, for example, to undertake base exchanges, remove parts of sequences or add natural or synthetic sequences. For the connection of the DNA fragments to one another, it is possible to add adapters or linkers to the fragments; see, for example, Sambrook et al., 1989, Molecular Cloning, A Laboratory Manual, 2nd ed., Cold Spring Harbor Laboratory Press, Cold Spring Harbor, N.Y.; or Winnacker "Gene and Klone" [Genes and Clones], VCH Weinheim, 2nd edition, 1996.

For example, the generation of plant cells with a reduced activity of a gene product can be achieved by expressing at least one corresponding antisense RNA, a sense RNA for achieving a cosuppression effect, or by expressing at least one suitably constructed ribozyme which specifically cleaves transcripts of the abovementioned gene product.

To this end, it is firstly possible to use DNA molecules which encompass the entire coding sequence of a gene product inclusive of any flanking sequences which may be present, and also DNA molecules which only encompass portions of the coding sequence, in which case it is necessary for these portions to be long enough to have an antisense effect in the cells. It is also possible to use DNA sequences which have a high degree of homology to the coding sequences of a gene product, but When expressing nucleic acid molecules in plants, the protein synthesized may be localized in any desired compartment of the plant cell. However, to achieve localization in a particular compartment, it is possible, for example, to join the coding region to DNA sequences which ensure localization in a particular compartment. Such sequences are known to those skilled in the art (see, for example, Braun et al., EMBO J. 11 (1992), 3219-3227; Wolter et al., Proc. Natl. Acad. Sci. USA 85 (1988), 846-850; Sonnewald et al., Plant J. 1 (1991), 95-106). The nucleic acid molecules can also be expressed in the organelles of the plant cells.

The transgenic plant cells can be regenerated by known techniques to give rise to entire plants. In principle, the transgenic plants may be plants of any desired plant species, i.e. not only monocotyledonous but also dicotyledonous plants.

Obtainable in this way are transgenic plants having properties altered by overexpression, suppression or inhibition of homologous (=natural) genes or gene sequences or expression of heterologous (=foreign) genes or gene sequences.

Preferably the compositions according to the invention can be used in transgenic crops which are resistant to growth regulators such as, for example, dicamba, or to herbicides which inhibit essential plant enzymes, for example acetolactate synthases (ALS), EPSP synthases, glutamine synthases (GS) or hydroxyphenylpyruvate dioxygenases (HPPD), or to herbicides from the group of the sulfonylureas, the glyphosates, glufosinate or benzoylisoxazoles and analogous active ingredients.

When the compositions according to the invention are employed in transgenic crops, not only do the effects toward harmful plants observed in other crops occur, but frequently also effects which are specific to application in the particular transgenic crop, for example an altered or specifically widened spectrum of weeds which can be controlled, altered application rates which can be used for the application, preferably good combinability with the herbicides to which the transgenic crop is resistant, and influencing of growth and yield of the transgenic crop plants.

The invention therefore also provides for the use of the compositions according to the invention for control of harmful plants in transgenic crop plants.

Components A and B can be converted together or separately to customary formulations, for example for application by atomizing, watering and spraying, such as solutions, emulsions, suspensions, powders, foams, pastes, granules, aerosols, active compound-impregnated natural and synthetic substances, microencapsulations in polymeric substances. The formulations may comprise the customary auxiliaries and additives.

These formulations are produced in a known manner, for example by mixing components A and B with extenders, i.e. liquid solvents, pressurized liquefied gases and/or solid carriers, optionally with use of surfactants, i.e. emulsifiers and/or dispersants and/or foam formers.

When the extender used is water, it is also possible to use, for example, organic solvents as auxiliary solvents. Useful liquid solvents are essentially: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, alcohols such as butanol or glycol and the ethers and esters thereof, ketones such as acetone, methyl ethyl ketone, methyl isobutyl ketone or cyclohexanone, strongly polar solvents such as dimethylformamide or dimethyl sulfoxide, and water.

Useful solid carriers include: for example ammonium salts and ground natural minerals, such as kaolins, clays, talc, chalk, quartz, attapulgite, montmorillonite or diatomaceous earth, and ground synthetic minerals, such as finely divided silica, alumina and silicates; useful solid carriers for granules include: for example crushed and fractionated natural rocks, such as calcite, marble, pumice, sepiolite, dolomite and synthetic granules of inorganic and organic flours, and granules of organic material, such as sawdust, coconut shells, corn cobs and tobacco stalks; useful emulsifiers and/or foam formers include: for example nonionic and anionic emulsifiers, such as polyoxyethylene fatty acid esters, polyoxyethylene fatty alcohol ethers, e.g. alkylaryl polyglycol ethers, alkylsulfonates, alkylsulfates, arylsulfonates and protein hydrolysates; useful dispersants include: for example lignosulfite waste liquors and methylcellulose.

Tackifiers, such as carboxymethyl cellulose, natural and synthetic polymers in the form of powders, granules or latices, such as gum arabic, polyvinyl alcohol and polyvinyl acetate, and also natural phospholipids, such as cephalins and lecithins, and synthetic phospholipids can be used in the formulations. Further additives may be mineral and vegetable oils.

It is possible to use colorants such as inorganic pigments, for example iron oxide, titanium oxide and Prussian blue, and organic colorants such as alizarin colorants, azocolorants and metal phthalocyanine colorants, and trace nutrients such as salts of iron, manganese, boron, copper, cobalt, molybdenum and zinc.

EXAMPLES

Materials Used

| | |
|---|---|
| Disflamoll ® TOF = TEHP | Tris(2-ethylhexyl) phosphate [TEHP] (Lanxess) |
| Genapol ® LRO paste | Aqueous solution of about 70% alkyl ether sulfate, Na salt (Clariant) |
| Genapol ® X-060 | Tridecyl polyethylene glycol ether, isotridecyl alcohol polyglycol ether with 6 EO (Clariant) (EO = ethylene oxide) |
| Crovol ® CR/70G | Ethoxylated vegetable oil (CRODA) |
| Geronol ® CF/AR-E | 70% mixture containing 25% C8-C10 mono- and dialkyl ether phosphate ammonium salts (Solvay) |
| Lucramul ® CO 30 | Ethoxylated castor oil, ethoxylated castor oil with 30 EO (Levaco) |

-continued

| | |
|---|---|
| Lucramul ® HOT 5902 | 2-Ethylhexanol propylene-ethylene glycol ether (Levaco) |
| Mero ® | Emulsion concentrate of 81.4% rapeseed oil methyl ester (Bayer) |
| AMS | Ammonium sulfate |
| Genapol ® C 100 | Coconut fatty alcohol polyglycol ether with 10 EO (Clariant) |
| Actirob ® B | Emulsion concentrate containing 812 g/l rapeseed oil methyl ester |
| Biopower ® | Soluble concentrated formulation containing 6.7% w/w (percent by weight) 3,6-dioxaeicosylsulfate sodium salt and 20.1% w/w 3,6-dioxaoctadecylsulfate sodium salt (Bayer) |
| TBEP premix V | as TEHP premix V, with TBEP rather than TEHP |
| TEHP premix I | 10% Genapol ® LRO paste, 10% Lucramul ® CO 30, 80% Disflamoll ® TOF = TEHP |
| TBEP premix I | 10% Genapol ® LRO paste, 10% Lucramul ® CO 30, 80% TBEP (tributoxyethyl phosphate) |
| Mefenpyr-diethyl | Diethyl (RS)-1-(2,4-dichlorophenyl)-4,5-dihydro-5-methyl-1H-pyrazole-3,5-dicarboxylate (Bayer) |
| Pyroxasulfone | 3-[5-(Difluoromethoxy)-1-methyl-3-(trifluoromethyl)pyrazol-4-ylmethylsulfonyl]-4,5-dihydro-5,5-dimethyl-1,2-oxazole (Kumiai) |
| Cyprosulfamide | N-[4-(Cyclopropylcarbamoyl) phenylsulfonyl]-o-anisamide (Bayer) |
| Rinskor ™ | Florpyrauxifen-benzyl, benzyl 4-amino-3-chloro-6-(4-chloro-2-fluoro-3-methoxyphenyl)-5-fluoropyridine-2-carboxylate (Dow) |
| Isoxaflutole | 5-Cyclopropyl-4-(2-methylsulfonyl-4-trifluoromethylbenzoyl)isoxazole (Bayer) |
| Tembotrione | 2-[2-Chloro-4-(methylsulfonyl)-3-[(2,2,2-(trifluoroethoxy)methyl] benzoyl]-1,3-cyclohexanedione (Bayer) |
| Synergen ® GA | C8-C10 Alkylglucamide (Clariant) |
| Atlas ® G5002L | Polyalkylene glycol ether, propoxylated (PO) and ethoxylated (EO) 4-butoxybutyl alcohol, butanol alkoxylates, liquid (CRODA) |
| Agrotin ® SL | SL280, adjuvant blend (Bayer) |
| DMA | Dimethylacetamide (Aldrich) |
| Bixlozone | 2-(2,4-Dichlorobenzyl)-4,4-dimethylisoxazolidin-3-one (FMC) |
| Prohexadione-Ca | Calcium 3-oxido-5-oxo-4-propionyl-cyclohex-3-enecarboxylate (BASF) |
| Kuraray Poval ® 26-88 | Polymer of polyvinyl alcohol (PVOH) with a hydrolysis level of about 88%; Mowiol ® 26-88 (Kuraray) |
| Laudis ™ SC | Commercially available product comprising tembotrione and safener (Bayer) |
| TBEP | Tributoxyethyl phosphate (Solvay) |
| Cinmethylin | (1S,2R,4R)-4-Isopropyl-1-methyl-2-[(2-methylbenzyl)oxy]-7-oxabicyclo[2.2.1]heptane (BASF) |
| Tolpyralate | 1-({1-Ethyl-4-[3-(2-methoxyethoxy)-2-methyl-4-(methylsulfonyl)benzoyl]-1H-pyrazol-5-yl}oxy)ethyl methyl carbonate (Ishihara Sangyo Kaisha Ltd) |
| Atplus ® UEP-100 | Alkoxylated polyol ester (CRODA) |
| Lab-EC | EC formulation as follows: Active ingredient in DMA (dimethylacetamide) with Lucramul ® PS 16 (tristyrylphenol ethoxylate 16 EO) |

-continued

| | |
|---|---|
| Compound 1 | Example I-553 in WO2016/102435 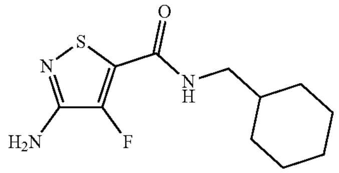 [SMILES: Nc1nsc(C(=O)NCC2CCCCC2)c1F] |
| Compound 2 | Example I-1117 in WO2016/102435 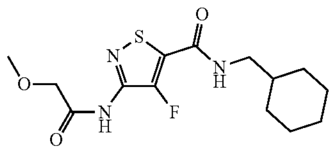 [SMILES: COCC(=O)Nc1nsc(C(=O)NCC2CCCCC2)c1F] |
| Compound 3 | Example Ia in WO2008/131861 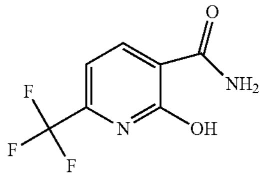 [SMILES: NC(=O)c1ccc(C(F)(F)F)nc1O] |
| Compound 4 | Example 1599 in WO2008/131860 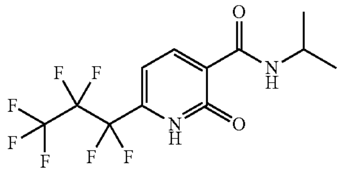 |
| Compound 5 | Example 1.4 in WO2018/184978 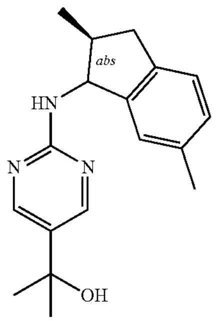 [SMILES: Cc1ccc2c(c1)C(Nc1ncc(C(C)(C)O)cn1)[C@@H](C)C2] |
| Compound 6 | Example I-214 in EP17205161.7 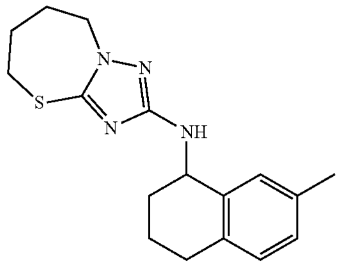 [SMILES: Cc1ccc2c(c1)C(Nc1nc3n(n1)CCCCS3)CCC2] |

The examples that follow show the effect on biological efficacy of the adjuvant combination according to the invention compared to other adjuvants, for example AMS, Mero®, Genapol® X-060, Genapol® C 100, Biopower®.

Example 1

The components according to Table 1 are weighed out and mixed by stirring, with addition of Disflamoll® TOF first. The batch sizes vary from 50 ml to 201 without further restrictions.

TABLE 1

Compositions of TEHP premix V

| Component | Name | % (w/w) | g/l |
|---|---|---|---|
| d | Genapol ® LRO paste | 6.25 | 62.5 |
| d | Genapol ® X-060 | 7.5 | 75 |
| b | Geronol ® CF/AR-E | 30 | 300 |
| c | Lucramul ® CO 30 | 6.25 | 62.5 |
| a | Disflamoll ® TOF | 50 | 500 |

Example 2: Dynamic Wetting Properties of TEHP Premix V—Contact Angle Measurement The wetting properties of the adjuvants were measured by measuring the contact angle on barley (HORVS) and on *Abutilon theophrasti* (ABUTH) (leaf surface of each) in order to represent a plant surface that is difficult to wet and one that is easily wetted. Measurements were made for concentrations of the premix in water at 3 g/l and 6 g/l, with tap water as comparison. The contact angle in ° was measured using a DSA10 goniometer from Krüss GmbH.

TABLE 2a

| Sample | ABUTH | HORVS |
|---|---|---|
| TEHP premix V, 3 g/l | 43 | 78 |
| TEHP premix V, 6 g/l | 44 | 56 |
| Tap water | 95 | 141 |

The results in Table 2a show that the adjuvant combinations according to the invention have excellent wetting properties, even in the case of barley leaves that are difficult to wet, and especially at relatively high concentration.

Table 2b: Contact angle on *Abutilon theophrasti* (ABUTH) and *Chenopodium album* (CHEAL) in ° (easily wetted weeds and those that are difficult to wet) of the adjuvant combination TEHP premix I and TEHP premix I in combination with Lucramol® Hot 5902:

| Sample | ABUTH | CHEAL |
|---|---|---|
| TEHP premix I, 6.25 g/l & Geronol ® CF/AR-E, 3 g/l | 41 | 51 |
| TEHP premix I, 6.25 g/l & Geronol ® CF/AR-E, 3 g/l & Lucramul ® HOT 5902, 1 g/l | 41 | 58 |
| Tap water | 105 | 147 |

Table 2b shows that Lucramul® HOT 5902 does not significantly improve the properties of TEHP premix I.

Example 3: Spray Retention Properties of TEHP Premix V

Spray retention (static wetting) was measured against Kuraray Poval® 26-88 as standard on barley. Application rate according to Table 3, at 300 l/ha water, spray cabin parameters: pressure 3 bar, XR11002VS nozzle.

TABLE 3

Results in %.

| Sample | Spray retention on barley in % |
|---|---|
| Kuraray Poval ® 26-88, 1 g/l (standard) | 82 |
| Tap water | 4 |
| Mero ®, 2 l/ha | 61 |
| Biopower ®, 1 l/ha | 56 |
| TEHP premix V, 6 g/l | 68 |
| TEHP premix V, 3 g/l | 52 |

Spray retention of the adjuvant combination according to the invention is comparable or better as compared with the comparative samples according to Table 3.

Example 4: Dynamic Surface Tension (DST)

Dynamic surface tension was determined via the bubble pressure method (BP2100 tensiometer, Krüss).

A value of 50 mN/m (at 20-21° C.) based on water (72.8 mN/m) shows an improvement in adhesion from "zero adhesion" (0%) to about 50% (Baur P., Pontzen R.; 2007; Basic features of plant surface wettability and deposit formation and the impact of adjuvant; in R. E. Gaskin ed. Proceedings of the 8th International Symposium on Adjuvants for Agrochemicals; Publisher: International Society for Agrochemical Adjuvants (ISAA), Columbus, Ohio, USA).

TABLE 4

TEHP premix V solo and as tankmix; TEHP premix I, 6.25 g/l + Geronol ® CF/AR-E, 3 g/l. Dynamic surface tension was measured for the various adjuvants/combinations and for the individual components. The results are shown in table 4.

| Sample | 20 ms | 50 ms | 200 ms | 500 ms |
|---|---|---|---|---|
| TEHP premix I, 6.25 g/l + Geronol ® CF/AR-E, 3 g/l | 56.8 | 51.1 | 45.8 | 42.4 |
| TEHP premix V, 6 g/l | 57.5 | 50.9 | 42.3 | 38.4 |
| TEHP premix I, 6 g/l | 69.1 | 63.0 | 52.5 | 46.8 |
| Lucramul ® CO 30, 3 g/l | 63.3 | 59.0 | 52.6 | 49.5 |
| TEHP, 6 g/l | 71.7 | 71.7 | 71.6 | 71.5 |
| Geronol ® CF/AR-E, 3 g/l | 61.6 | 58.1 | 54.0 | 52.0 |
| Genapol ® LRO paste, 3 g/l | 54.9 | 43.9 | 35.4 | 32.5 |
| Genapol ® X-060 | 56.2 | 40.9 | 28.6 | 27.2 |
| Tap water | 72.0 | 72.1 | 72.1 | 72.0 |

The adjuvant combinations according to the invention have a DST close to that of the very good wetting agents Genapol® LRO paste and Genapol® X-060, as can be seen in Table 4. The adjuvant combinations according to the invention, at 200 ms (relevant timeframe between spraying of a droplet and contact with the leaf), have better properties than the two main constituents of the adjuvant combination tested individually.

Example 5: Plant Compatibility—Phytotoxicity

The tests were conducted on *Euphorbia pulcherrima* leaves with droplet application. Each test was repeated with 2×10 ml dripped onto the same leaf. After drying, after 24 h, the phytotoxic effects were determined using an in-house checklist. The standard is Genapol® 100. Concentrations measured: 0.1-0.3-1.0-3.0 g/l. For TEHP premix V, phytotoxic effects (brown spots) were observed only at the highest concentration used, whereas the standard showed these effects even at 1 g/l.

Example 6: Penetration Properties of Various Herbicides, Plant Growth Regulators (PGRs) and Safeners The properties of the adjuvant combinations according to the invention as penetration enhancers were measured in a membrane penetration test on the cuticula of apple leaves.

Determination of bioavailability of various herbicides, plant growth regulators (PGRs) and safeners by cuticle penetration test.

The principle of the determination has already been published (e.g. WO-A-2005/194844; Baur, 1997; Baur, Grayson and Schönherr 1999; Baur, Bodelon and Lowe, 2012), and so only the particular conditions will be given hereinafter.

The leaf cuticles were isolated enzymatically as described in the literature. The stomata-free cuticles were first dried under air and introduced into stainless steel diffusion cells. After the application of the test liquids to the original top side of the leaf and evaporation of liquid, the diffusion cells were transferred into thermostat blocks and loaded with water. At regular intervals, aliquot samples were taken, and the amount of active ingredient diffused was determined by means of HPLC. During the experiment, relative air humidity was kept constant at 56% at a constant 25° C. The analytical determination by HPLC (1260 II Infinity, Agilent) was conducted on a Kinetex 50×2.1 mm, 2.6μ C18 column (Phenomenex) at a flow rate of 0.8 ml/min in acetonitrile/ultrapure water +0.01 M $H_3PO_4$ as eluent, using 20 μl aliquots as sample. Detection was effected with a DAD detector. The results given in each case are the geometric penetration averages at the average measurement times. According to the variance, 10 repeat measurements were conducted. The coefficient of variation was below 35%, which corresponds to a typical value of biological variability for the penetration of different plants (Baur 1997).

Typically, a spray solution of the active ingredient (0.5 g of active ingredient/l) was produced. An aliquot was applied to an apple cuticle and left to dry. The operation was repeated 10 times. The amount absorbed through the cuticles in the uptake solution is determined by HPLC as described above. The measurements were made after 0, 6, 12, 24, 36 or 48 h. The temperature was increased from 25° C. to 35° C. after 24 h in order to test solubility effects of the adjuvant. In some measurements, the temperature was kept at 25° C. or 35° C. from the start.

TABLE 5

Effect of various adjuvants/adjuvant combinations on cuticle penetration with tembotrione as standard (Laudis™ SC)

| Run | Adjuvant | Cuticle penetration 6 h in % | Cuticle penetration 12 h in % | Cuticle penetration 24 h in % |
|---|---|---|---|---|
| 1 | TEHP premix V, 6 g/l | 39 | 73 | 86 |
| 2 | Geronol ® CF/AR-E, 3 g/l | 6 | 26 | 58 |
| 3 | Disflamoll ® TOF = TEHP, 6 g/l | 3 | 10 | 21 |
| 4 | Genapol ® LRO paste, 3 g/l | 0 | 3 | 9 |
| 5 | Genapol ® X-060, 3 g/l | 0 | 0 | 0 |
| 6 | Lucramul ® CO 30, 3 g/l | 0 | 0 | 0 |

Table 5 shows that none of the individual constituents of the adjuvant combination according to the invention acts as a penetration enhancer for tembotrione, whereas, surprisingly, TEHP premix shows a distinct enhancement.

Effect of TBEP compared to TEHP in the adjuvant combination according to the invention.

TBEP is a known solvent which is used in EC formulations. It is structurally similar to TEHP.

TABLE 6

TBEP vs TEHP with tembotrione (Laudis™ SC) as standard

| Run | Adjuvant | Cuticle penetration 6 h in % | Cuticle penetration 12 h in % | Cuticle penetration 24 h in % |
|---|---|---|---|---|
| 1 | TEHP premix V, 6 g/l | 59 | 94 | 107 |
| 2 | TEHP premix I, 6 g/l | 8 | 16 | 34 |
| 3 | TBEP premix V, 6 g/l | 6 | 22 | 28 |
| 4 | TBEP premix I, 6 g/l | 0 | 8 | 11 |
| 5 | AMS, 1 g/l & Mero ®, 3 g/l | 59 | 69 | 77 |
| 6 | — | 0 | 0 | 0 |

Table 6 shows that TBEP does not enhance the uptake of tembotrione.

TABLE 7

TBEP vs TEHP with bixlozone as standard (standard SC formulation).

| Run | Adjuvant | Cuticle penetration 6 h in % | Cuticle penetration 12 h in % | Cuticle penetration 24 h in % |
|---|---|---|---|---|
| 1 | TEHP premix V, 6 g/l | 91 | 89 | 91 |
| 2 | TEHP premix I, 6 g/l | 78 | 79 | 83 |
| 3 | TBEP premix V, 6 g/l | 58 | 61 | 66 |
| 4 | TBEP premix I, 6 g/l | 66 | 70 | 74 |
| 5 | Mero ®, 3 g/l | 84 | 82 | 88 |
| 6 | none | 21 | 42 | 62 |

Table 7 shows that TBEP shows distinctly lower uptake of bixlozone than TEHP.

TABLE 8

TBEP vs TEHP with mefenpyr-diethyl (SC formulation as described in WO2017144497).

| Run | Adjuvant | Cuticle penetration 12 h in % | Cuticle penetration 24 h in % | Cuticle penetration 48 h in % |
|---|---|---|---|---|
| 1 | TBEP premix V, 6 g/l | 69 | 76 | 81 |
| 2 | TBEP-TM1, 6 g/l | 76 | 83 | 86 |
| 3 | TEHP premix V, 6 g/l | 87 | 91 | 94 |

TABLE 8-continued

TBEP vs TEHP with mefenpyr-diethyl (SC formulation as described in WO2017144497).

| Run | Adjuvant | Cuticle penetration 12 h in % | Cuticle penetration 24 h in % | Cuticle penetration 48 h in % |
|---|---|---|---|---|
| 4 | TEHP-TM1, 6 g/l | 83 | 87 | 87 |
| 5 | Mero ®, 3 g/l | 79 | 87 | 87 |
| 6 | none | 4 | 9 | 16 |

Table 8 shows that, here too, TEHP has better penetration-enhancing properties compared to TBEP in the combination.

TABLE 9

Biopower ® vs TEHP with mefenpyr-diethyl (SC formulation as described in WO2017144497).

| Run | Adjuvant | Cuticle penetration 24 h in % | Cuticle penetration 48 h in % |
|---|---|---|---|
| 1 | — | 17 | 59 |
| 2 | TEHP premix V, 6 g/l | 94 | 100 |
| 3 | Biopower ®, 3 g/l | 42 | 94 |

Table 9 here too shows faster uptake with the adjuvant combination according to the invention.

TABLE 10

Mero ® vs TEHP with pyroxasulfone (SC formulation).

| Run | Adjuvant | Cuticle penetration 24 h in % |
|---|---|---|
| 1 | — | 2 |
| 2 | TEHP premix V, 6 g/l | 34 |
| 3 | Mero ®, 5 g/l & AMS, 1 g/l | 30 |
| 4 | Mero ®, 5 g/l | 27 |

Table 10 shows that, even in the case of water-insoluble pyroxasulfone, the adjuvant combinations according to the invention show a slight improvement in uptake.

TABLE 11

Cyprosulfamide WP20 formulation (wettable powder).

| Run | Adjuvant | Cuticle penetration 24 h in % |
|---|---|---|
| 1 | Mero ®, 7 g/l | 12 |
| 2 | TEHP premix V, 6 g/l | 62 |
| 3 | Mero ®, 7 g/l & AMS, 3 g/l | 38 |
| 4 | TEHP premix I, 6 g/l | 18 |

TABLE 12

Rinskor ™ EC formulation (emulsifiable concentrate).

| Run | Adjuvant | Cuticle penetration 24 h in % | Cuticle penetration 48 h in % |
|---|---|---|---|
| 1 | Mero ®, 5 g/l | 22 | 40 |
| 2 | TEHP premix V, 5 g/l | 24 | 49 |
| 3 | Mero ®, 5 g/l & AMS, 2 g/l | 22 | 31 |

TABLE 12-continued

Rinskor ™ EC formulation (emulsifiable concentrate).

| Run | Adjuvant | Cuticle penetration 24 h in % | Cuticle penetration 48 h in % |
|---|---|---|---|
| 4 | TEHP premix I, 5 g/l | 14 | 26 |
| 5 | AMS, 2 g/l | 5 | 15 |

TABLE 13

Isoxaflutole OD formulation (oil dispersion) with different loading

| Run | Adjuvant | Cuticle penetration 24 h in % |
|---|---|---|
| OD 50 G | — | 16 |
| OD 200 G | — | 8 |
| OD 200 G | Mero ®, 5 g/l | 76 |
| OD 50 G | TEHP premix V, 5 g/l | 78 |
| OD 200 G | TEHP premix V, 5 g/l | 81 |

TABLE 14

Tembotrione SC formulation (suspension concentrate). Cuticle from 2016

| Run | Adjuvant | Cuticle penetration 24 h in % |
|---|---|---|
| 1 | — | 0 |
| 2 | TEHP premix V, 6 g/l | 57 |
| 3 | Mero ®, 5 g/l & AMS, 1 g/l | 50 |
| 4 | TEHP premix I, 5.25 g/l | 11 |

TABLE 15

Tembotrione SC formulation (suspension concentrate). Cuticle from 2015

| Run | Adjuvant | Cuticle penetration 24 h in % | Cuticle penetration 48 h in % |
|---|---|---|---|
| 1 | TEHP premix V, 6 g/l | 93 | 104 |
| 2 | Mero ®, 5 g/l & AMS, 1 g/l | 73 | 79 |
| 3 | TEHP premix I, 6.25 g/l | 30 | 45 |

TABLE 16

Tembotrione SC formulation (suspension concentrate). Cuticle from 2014

| Run | Adjuvant | Cuticle penetration 24 h in % |
|---|---|---|
| 1 | TEHP premix I, 6.25 g/l | 28 |
| 2 | Mero ®, 5 g/l & AMS, 1 g/l | 79 |
| 3 | TEHP premix V, 6.25 g/l | 104 |

TABLE 17

| Tembotrione OD formulation (oil dispersion). | | |
|---|---|---|
| Run | Adjuvant | Cuticle penetration 24 h in % |
| 1 | TEHP premix V, 6 g/l | 93 |
| 2 | TEHP premix I, 6.25 g/l | 53 |
| 3 | none | 13 |

TABLE 18

| Cinmethylin WP20 formulation. | | | |
|---|---|---|---|
| Run | Adjuvant | Cuticle penetration 24 h in % | Cuticle penetration 48 h in % |
| 1 | Agrotin ® SL, 2 g/l | 15 | 19 |
| 2 | Lucramul ® CO 30, 2 g/l | 38 | 37 |
| 3 | Mero ®, 5 g/l & AMS, 2 g/l | 52 | 51 |
| 4 | TEHP premix V, 5 g/l | 52 | 51 |

Other adjuvant classes (ethoxylated castor oils, ethoxylated nonylphenol, ethoxylated NPEs) are ineffective.

TABLE 19

| Bixlozone SC formulation (suspension concentrate) | | | |
|---|---|---|---|
| Run | Adjuvant | Cuticle penetration 24 h in % | Cuticle penetration 48 h in % |
| 1 | — | 24 | 73 |
| 2 | TEHP premix V, 6 g/l | 93 | 105 |
| 3 | Biopower ®, 3 g/l | 47 | 76 |
| 4 | Synergen ® GA, 3 g/l | 37 | 82 |
| 5 | TEHP premix I, 6 g/l | 85 | 90 |

TABLE 20

| Prohexadione-Ca EC formulation | | | |
|---|---|---|---|
| Run | Adjuvant | Cuticle penetration 24 h in % | Cuticle penetration 48 h in % |
| 1 | — | 18 | 44 |
| 2 | Agrotin ® SL, 2 g/l | 62 | 85 |
| 3 | Mero ®, 5 g/l & AMS, 2 g/l | 77 | 92 |
| 4 | Lucramul ® CO 30, 2 g/l | 36 | 90 |
| 5 | TEHP premix V, 6 g/l | 96 | 112 |

TABLE 21

| Compound 1 EC formulation | | | |
|---|---|---|---|
| Run | Adjuvant | Cuticle penetration 12 h in % | Cuticle penetration 24 h in % |
| 1 | TEHP premix V, 6 g/l | 105 | 104 |
| 2 | Atplus ® UEP-100, 2 g/l | 64 | 81 |

TABLE 21-continued

| Compound 1 EC formulation | | | |
|---|---|---|---|
| Run | Adjuvant | Cuticle penetration 12 h in % | Cuticle penetration 24 h in % |
| 3 | Biopower ®, 3 g/l | 48 | 62 |
| 4 | Atlas ® G5002L, 2 g/l | 37 | 58 |

TABLE 22

| Compound 1 EC formulation compared to WP20 | | | |
|---|---|---|---|
| Run | Adjuvant | Cuticle penetration 12 h in % | Cuticle penetration 24 h in % |
| Lab EC | TEHP premix V, 5 g/l | 70 | 93 |
| Lab EC | Biopower ®, 3 g/l | 8 | 27 |
| Lab EC | Mero ®, 3 g/l | 25 | 47 |
| WP20 | TEHP premix V, 5 g/l | 25 | 56 |
| WP20 | Biopower ®, 3 g/l | 0 | 6 |
| WP20 | Mero ®, 3 g/l | 21 | 53 |

TABLE 23

| Compound 2 WP20 formulation. | | | |
|---|---|---|---|
| Run | Adjuvant | Cuticle penetration 12 h in % | Cuticle penetration 24 h in % |
| 1 | TEHP premix V, 6 g/l | 78 | 89 |
| 2 | Mero ®, 5 g/l | 72 | 89 |
| 3 | Genapol ® X-060, 2 g/l | 30 | 45 |
| 4 | Crovol ® CR/70G, 2 g/l | 15 | 26 |
| 5 | Lucramul ® HOT 5209 | | |

TABLE 24

| Compound 3 WP20 formulation. Cuticle from 2016 | | | | |
|---|---|---|---|---|
| Run | Adjuvant | Cuticle penetration 12 h in % | Cuticle penetration 24 h in % | Cuticle penetration 48 h in % |
| 1 | TEHP premix V, 5 g/l | 76 | 100 | 111 |
| 2 | Agrotin ® SL, 2 g/l | 0 | 3 | 3 |
| 3 | Lucramul ® CO 30, 2 g/l | 2 | 3 | 4 |
| 4 | Mero ®, 5 g/l & AMS, 2 g/l | 37 | 49 | 86 |
| 5 | none | 0 | 0 | 0 |

TABLE 25

Compound 3 WP20 formulation, cuticle from 2016, but different batch than in Table 24

| Run | Adjuvant | Cuticle penetration 6 h in % | Cuticle penetration 12 h in % | Cuticle penetration 24 h in % | Cuticle penetration 48 h in % |
|---|---|---|---|---|---|
| 1 | TEHP premix V, 5 g/l | 42 | 69 | 88 | 110 |
| 2 | Genapol ® C 100, 2 g/l | 0 | 1 | 11 | 15 |
| 3 | Genapol ® X-060, 2 g/l | 0 | 0 | 1 | 14 |
| 4 | Crovol ® CR/70G, 2 g/l & AMS, 2 g/l | 21 | 51 | 76 | 101 |
| 5 | Crovol ® CR/70G, 2 g/l | 0 | 0 | 0 | 9 |
| 6 | Mero ®, 5 g/l | 9 | 30 | 41 | 52 |

TABLE 26

Bixlozone EC formulation.

| Run | Adjuvant | Cuticle penetration 6 h in % | Cuticle penetration 12 h in % | Cuticle penetration 24 h in % |
|---|---|---|---|---|
| 1 | Mero ®, 3 g/l | 60 | 62 | 66 |
| 2 | TEHP premix V, 5 g/l | 60 | 61 | 64 |
| 3 | Genapol ® X-060, 1 g/l | 34 | 34 | 41 |
| 4 | Lucramul ® HOT 5902, 1 g/l | 32 | 34 | 37 |
| 5 | none | 27 | 29 | 31 |
| 6 | Crovol ® CR/70G, 1 g/l | 20 | 21 | 22 |

TABLE 27

Tolpyralate EC formulation.

| Run | Adjuvant | Cuticle penetration 12 h in % | Cuticle penetration 24 h in % | Cuticle penetration 48 h in % |
|---|---|---|---|---|
| 1 | TEHP premix V, 5 g/l | 28 | 41 | 80 |
| 2 | Actirob ® B, 5 g/l | 19 | 25 | 41 |
| 3 | Mero ®, 5 g/l | 18 | 22 | 32 |

TABLE 28

Compound 4 WP20 formulation

| Run | Adjuvant | Cuticle penetration 12 h in % | Cuticle penetration 24 h in % | Cuticle penetration 48 h in % |
|---|---|---|---|---|
| 1 | TEHP premix V, 5 g/l | 65 | 84 | 119 |
| 2 | Agrotin ® SL, 2 g/l | 0 | 0 | 0 |
| 3 | Lucramul ® CO 30, 2 g/l | 0 | 0 | 0 |
| 4 | Mero ®, 5 g/l & AMS, 2 g/l | 16 | 37 | 78 |
| 5 | none | 0 | 0 | 0 |

TABLE 29

Compound 4 EC formulation.

| Run | Adjuvant | Cuticle penetration 12 h in % | Cuticle penetration 24 h in % | Cuticle penetration 48 h in % |
|---|---|---|---|---|
| 1 | TEHP premix V, 5 g/l | 31 | 44 | 74 |
| 2 | Crovol ® CR/70G, 2 g/l | 0 | 0 | 12 |

TABLE 29-continued

Compound 4 EC formulation.

| Run | Adjuvant | Cuticle penetration 12 h in % | Cuticle penetration 24 h in % | Cuticle penetration 48 h in % |
|---|---|---|---|---|
| 3 | Lucramul ® HOT 5902, 2 g/l | 0 | 0 | 1 |
| 4 | Mero ®, 5 g/l & AMS, 2 g/l | 20 | 30 | 66 |
| 5 | Mero ®, 5 g/l | 36 | 54 | 75 |
| 6 | none | 0 | 0 | 0 |

TABLE 30

Compound 5 WP20 formulation

| Run | Adjuvant | Cuticle penetration 12 h in % | Cuticle penetration 24 h in % | Cuticle penetration 48 h in % |
|---|---|---|---|---|
| 1 | TEHP premix V, 5 g/l | 107 | 120 | 137 |
| 2 | Agrotin ® SL, 2 g/l | 64 | 79 | 104 |
| 3 | Lucramul ® CO 30, 2 g/l | 79 | 95 | 114 |
| 4 | Mero ®, 5 g/l & AMS, 2 g/l | 96 | 104 | 119 |
| 5 | none | 6 | 14 | 52 |

TABLE 31

Compound 6 WP20 formulation

| Run | Adjuvant | Cuticle penetration 12 h in % | Cuticle penetration 24 h in % | Cuticle penetration 48 h in % |
|---|---|---|---|---|
| 1 | TEHP premix V, 5 g/l | 24 | 36 | 62 |
| 2 | Agrotin ® SL, 2 g/l | 6 | 8 | 12 |
| 3 | Lucramul ® CO 30, 2 g/l | 7 | 8 | 16 |
| 4 | Mero ®, 5 g/l & AMS, 2 g/l | 36 | 48 | 66 |
| 5 | none | 0 | 0 | 2 |

As the preceding examples show, the adjuvant combinations according to the invention show very good properties as penetration enhancers for a number of different active agrochemical ingredients in different formulation types.

The invention claimed is:

1. An adjuvant combination consisting of:

a) tris(2-ethylhexyl) phosphate (TEHP), present at about 50% by weight, based on a total weight of the adjuvant combination;

b) an alkyl ether phosphate ammonium salt, present at about 30% by weight, based on the total weight of the adjuvant combination;

c) an emulsifier selected from castor oil polyglycol ether esters, present at about 6.25% by weight, based on the total weight of the adjuvant combination;

d) a first wetting agent selected from a sodium alkyl ether sulfate, present at about 6.25% by weight, based on the total weight of the adjuvant combination; and e) a second wetting agent selected from isotridecyl alcohol polyglycol ether with 6 ethylene oxide (EO), present at about 7.5% by weight, based on the total weight of the adjuvant combination.

2. The adjuvant combination according to claim 1, wherein b) is a 70% blend of C8-C10 mono- and dialkyl ether phosphate ammonium salts with free C8-C10 alcohols <10% and <10% triethylene glycol monobutyl ether.

3. The adjuvant combination according to claim 1, wherein c) is selected from the group consisting of nonionic dispersants comprising ethoxylated nonylphenols, ethylene oxide-propylene oxide block copolymers, endgroup-capped and non-endgroup-capped alkoxylated linear and branched, saturated and unsaturated alcohols, reaction products of alkylphenols with ethylene oxide and/or propylene oxide, ethylene oxide-propylene oxide block copolymers, polyethylene glycols and polypropylene glycols, fatty acid esters, fatty acid polyglycol ether esters, alkylsulfonates, alkylsulfates, arylsulfates, ethoxylated arylalkylphenols, ethoxylated and propoxylated arylalkylphenols, sulfated or phosphated arylalkylphenol ethoxylates or ethoxy- and propoxylates, and mixtures thereof.

4. The adjuvant combination according to claim 1, wherein at least one of d) and e) is selected from the group consisting of alkali metal, alkaline earth metal or ammonium salts of sulfonates, sulfates, optionally alkyl ether sulfates, optionally the sodium salts of alkyl ether sulfates, phosphates, carboxylates and mixtures thereof, optionally the salts of the alkylsulfonic acids or alkylphosphoric acids and alkylarylsulfonic or alkylarylphosphoric acids, diphenylsulfonates, alpha-olefinsulfonates, lignosulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates, and nonionic wetting agents that are reaction products of linear or branched alcohols with ethylene oxide, which may be endgroup-capped or non-endgroup-capped, and also mixtures thereof.

5. An herbicidal composition comprising:

A) at least one active agrochemical ingredient selected from the group consisting of herbicides, plant growth regulators and safeners, and B) the adjuvant combination according to claim 1.

6. The herbicidal composition according to claim 5, wherein the active agrochemical ingredient is selected from the group consisting of tembotrione, isoxaflutole, bixlozone, pyroxasulfone, XDE-848, thiafenacil, prohexadione-Ca, mefenpyr-diethyl and cyprosulfamide.

7. The herbicidal composition according to claim 5, comprising an emulsion concentrate, oil dispersion, suspension emulsion, capsule suspension, dispersible concentrate, soluble liquid, emulsion in water, suspension concentrate or wettable powder.

8. The herbicidal composition according to claim 5, wherein components A) and B) are present in a spray liquor diluted ready for use at A) 0.1-1.5 g/l, and B) 3-8 g/1.

9. A product comprising the adjuvant combination according to claim 1 for improving foliar uptake of herbicides, plant growth regulators and/or safeners.

* * * * *